Patented June 17, 1952

2,601,075

UNITED STATES PATENT OFFICE 2,601,075

PROCESS FOR PREPARING SUBSTITUTED CYCLOHEXANES

John E. Wicklatz, Bartlesville, Okla., and James N. Short, Cincinnati, Ohio, assignors to Phillips Petroleum Company, a corporation of Delaware No Drawing. Application November 15, 1948, Serial No. 60,173

3 Claims. (Cl. 260—666)

This invention relates to new chemical compounds. In one aspect this invention relates to the production of chemical compounds.

We have discovered a process for making new and useful chemical compounds having especial utility in various organic syntheses, especially in the polymerization field wherein they serve as important intermediates in the manufacture of resinous polymers having numerous applications.

An object of this invention is to provide new and useful chemical compounds.

Another object is to provide methods for preparing new and useful organic compounds having especial utilization as intermediates in organic syntheses.

Further objects and advantages will be apparent, to one skilled in the art, from the accompanying disclosure and discussion.

We have discovered a new class of chemical compounds having the following structural formula:

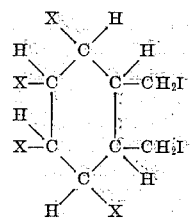

where any X is selected from the group consisting of hydrogen, methyl, ethyl, n-propyl, i-propyl, n-butyl, i-butyl, methoxy, ethoxy, propoxy, and butoxy, the total number of carbon atoms in the preceding combined X radicals being not greater than 12, phenylmethyl, phenylethyl, phenylisopropyl, phenyl-n-propyl, phenylisobutyl, phenyl-n-butyl, phenyl, methylphenyl, ethylphenyl, isopropylphenyl, n-propylphenyl, chlorophenyl, bromophenyl, fluorophenyl, the total number of phenyl-containing radicals in the preceding combined X radicals being not greater than 3, chlorine, fluorine and bromine. These compounds are 1,2-bis-(iodomethyl)-cyclohexanes, and may be prepared in the series of steps briefly described as follows: (1) Condensation of butadiene or the derivative thereof having the structural formula,

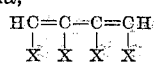

where any X is selected from the group consisting of hydrogen, methyl, ethyl, n-propyl, i-propyl, n-butyl, i-butyl, methoxy, ethoxy, propoxy, and butoxy, the total number of carbon atoms in the preceding combined X radicals being not greater than 12, phenylmethyl, phenylethyl, phenylisopropyl, phenyl-n-propyl, phenylisobutyl, phenyl-n-butyl, phenyl, methylphenyl, ethylphenyl, isopropylphenyl, n-propylphenyl, chlorophenyl, bromophenyl, fluorophenyl, the total number of phenyl-containing radicals in the preceding combined X radicals being not greater than 3, chlorine, fluorine and bromine, with maleic anhydride, in an appropriate solvent such as benzene, to produce the corresponding tetrahydrophthalic anhydride, as illustrated in the following equation:

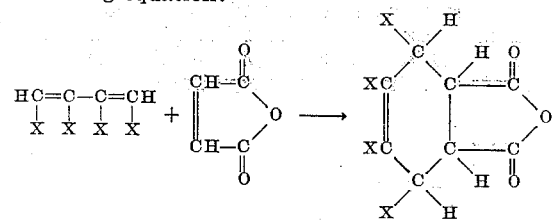

(2) Hydrogenation of the tetrahydrophthalic anhydride condensation product from step (1) to produce the corresponding saturated anhydride in accordance with the following equation:

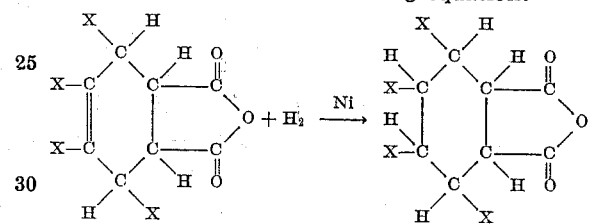

(3) Esterification of the saturated anhydride product formed in step (2) to form the corresponding diethylhexahydrophthalate as illustrated in the following equation:

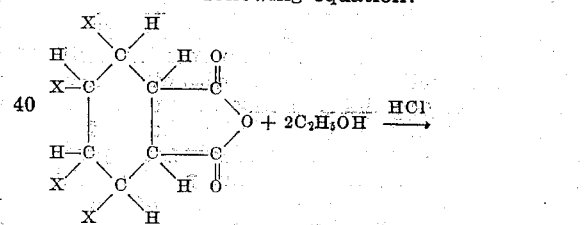

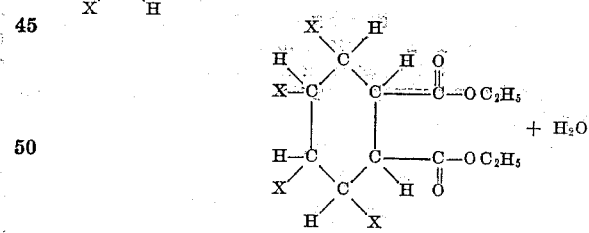

(4) Conversion of the diethyl ester product of step (3) to the corresponding 1,2-bis-(hydroxymethyl)-cyclohexane by catalytic reduction with hydrogen in the presence of a hydrogenation catalyst such as, for example, nickel, or molybdenum oxide as illustrated in the following equation:

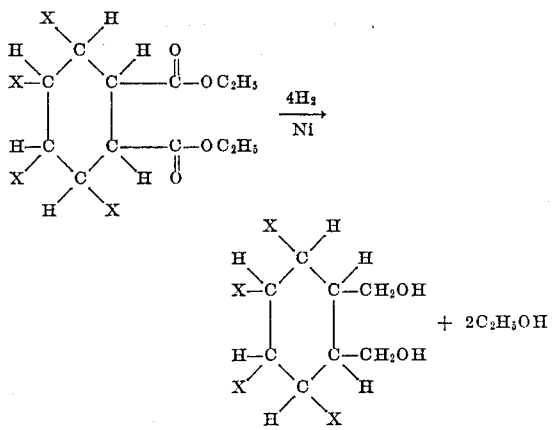

or, if no X is halogen, conversion of the diethyl ester product of step (3) to the corresponding 1,2-bis-(hydroxymethyl)-cyclohexane may be effected by reduction with ethyl alcohol and sodium, and in a final step (5) formation of a new 1,2-bis-(iodomethyl)-cyclohexane compound, already described, from the dihydroxy compound formed in step (4) by reaction with red phosphorus and iodine, or phosphorus triiodide, as illustrated in the following equation:

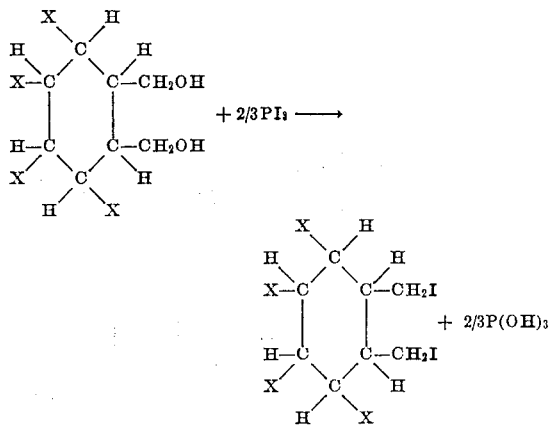

When in step (5), X is hydrogen, the new compound formed is 1,2-bis-(iodomethyl)-cyclohexane. This new compound is colorless when pure, but may be darkened by traces of decomposition products. Purification is effected by washing the colored impure product with dilute sodium hydroxide or thiosulfate solution until colorless, extracting the product with ether, drying the ether-containing product, removing the ether by evaporation and distilling the product from the ether-free mixture under reduced pressure. The product has a boiling point of 139 to 141° C., as measured at a pressure of 3 mm. of mercury. The density of the new compound as measured at 20° C. is 2.001.

We have discovered another new class of chemical compounds having the following structural formula:

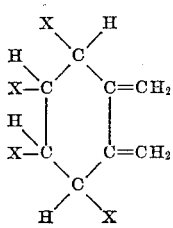

where any X is selected from the group consisting of hydrogen, methyl, ethyl, n-propyl, i-propyl, n-butyl, i-butyl, methoxy, ethoxy, propoxy, and butoxy, the total number of carbon atoms in the preceding combined X radicals being not greater than 12, phenylmethyl, phenylethyl, phenylisopropyl, phenyl-n-propyl, phenylisobutyl, phenyl-n-butyl, phenyl, methylphenyl, ethylphenyl, isopropylphenyl, n-propylphenyl, chlorophenyl, bromophenyl, fluorophenyl, the total number of phenyl-containing radicals in the preceding combined X radicals being not greater than 3, fluorine, chlorine and bromine. These new compounds are 1,2-dimethylenecyclohexanes, and may be prepared in exact accordance with the 5-step procedure already described, plus an additional step (6) which is dehydrohalogenation of the 1,2-bis-(iodomethyl)-cyclohexane product of step (5) above, as illustrated by the following equation:

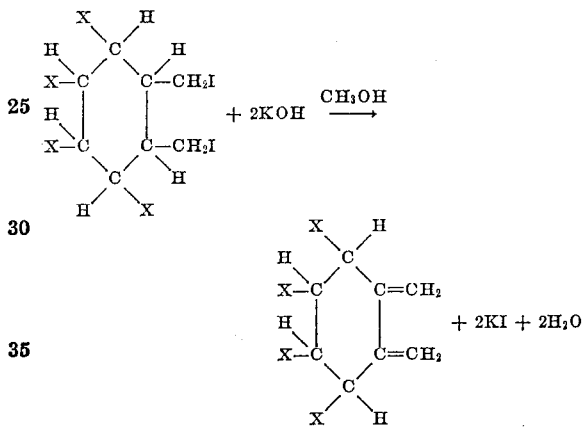

When in step (6) X is hydrogen, the new compound is 1,2-dimethylenecyclohexane, which is a colorless liquid boiling at 48.8 to 49.4° C., as measured at a pressure of 55 mm. of mercury, has a refractive index of 1.4710 at 25° C., and a density at 25° C. of 0.8299.

1,2-dimethylenecyclohexane has useful applications in organic syntheses, and, being of the conjugated diolefin type, may be employed as a monomeric material in polymerization reactions, either alone or with copolymerizable monomers. Materials with which 1,2-dimethylenecyclohexane may be suitably copolymerized comprise other conjugated dienes, such as 1,3-butadiene, isoprene, piperylene, and the like, and various vinyl compounds such as styrene, alpha-methylstyrene, chlorostyrene, and other vinyl compounds which are known to undergo polymerization reactions with conjugated dienes. 1,2-bis-(iodomethyl)-cyclohexane is of especial value as an intermediate in organic syntheses. As we have discovered, the 1,2-bis-(iodomethyl)-cyclohexanes, are important intermediates in the formation of the 1,2-dimethylenecyclohexanes of this invention which are especially suitable as intermediates in the manufacture of resinous polymers.

While the 1,2-dimethylenecyclohexane compounds of our invention can be prepared from the corresponding 1,2-bis-(iodomethyl)-cyclohexane, as already described, we may employ other methods. For example, we may substitute Br or Cl for I in the 1,2-bis-(iodomethyl)-cyclohexane compound, and dehydrohalogenate, the halogenated product being obtained from any desired source. By another method we may prepare the 1,2-dimethylenecyclohexane compounds of our invention by a series of reactions illustrated by the following equations: (7) reacting butadiene with chlorine to form 1,4-dichlorobutene-2 in accordance with the following equation:

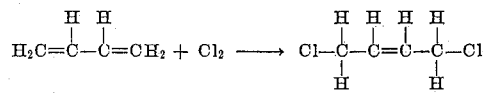

(8) condensing an equivalent proportion of the butadiene compound,

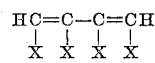

already described, with the 1,4-dichlorobutene-2 formed in the preceding step, in accordance with the following equation:

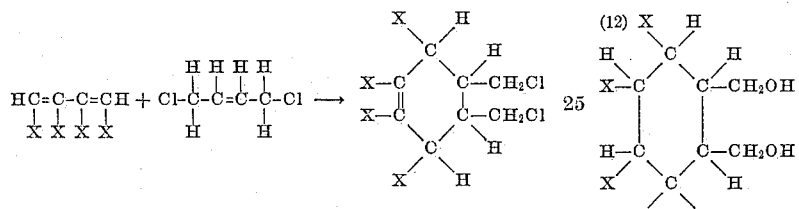

(9) hydrogenation of the 1,2-bis-(chloromethyl)-cyclohexane product of step (8) to produce the corresponding saturated compound in accordance with the following equation:

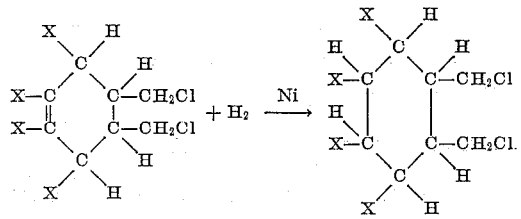

and (10) dehydrohalogenation of the saturated product of step (9) to produce the corresponding 1,2-dimethylenecyclohexane compound in accordance with the following equation:

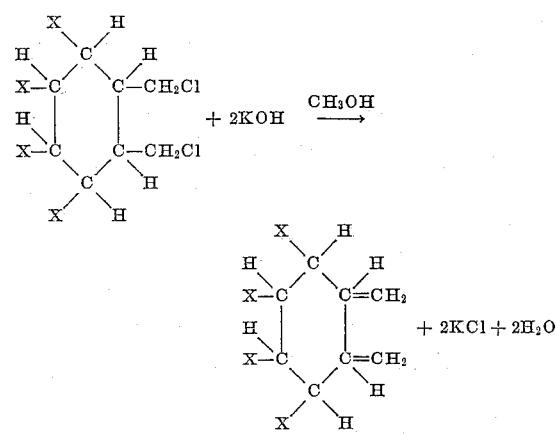

By another method we may prepare the 1,2-dimethylenecyclohexane compounds of our invention from the 1,2-bis-(hydroxymethyl)-cyclohexane product of step (4), by dehydration in the presence of a suitable dehydration catalyst such as for example, alumina, aluminum silicate, phosphoric acid on silica gel, silica-alumina, and the like, usually at a temperature within the range of 65 to 150° C. as illustrated by the following Equation 11:

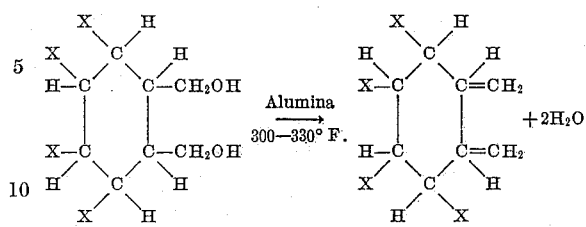

By still another method we may prepare the 1,2-dimethylenecyclohexane compounds of our invention by conversion of the 1,2-bis-(hydroxymethyl)-cyclohexane product of step (4) to a corresponding diester followed by pyrolysis of the diester product, as illustrated in the following equations wherein the acetate is first formed and then pyrolyzed to the desired product of this invention,

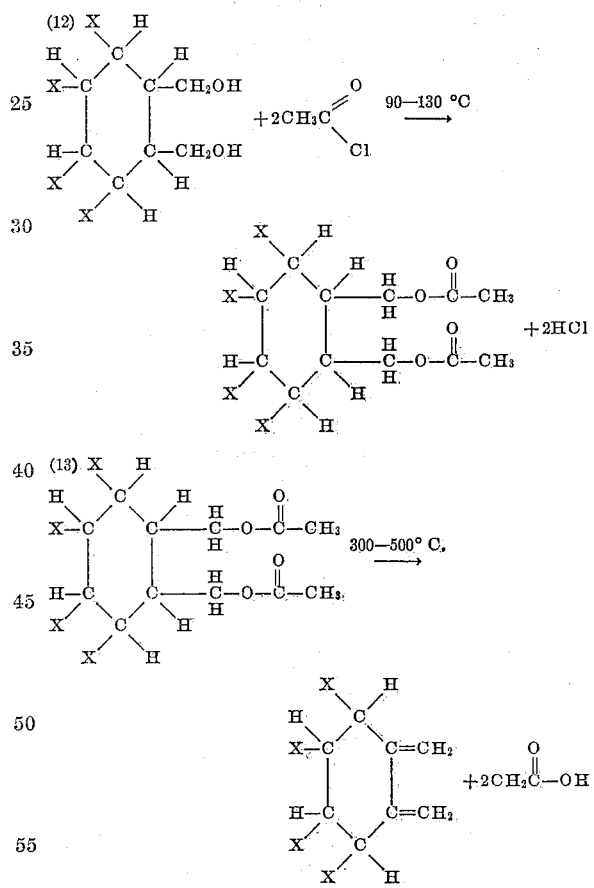

Among the butadienes having the structural formula:

described above, that may be employed in the preparation of the new compounds of our invention are butadiene, piperylene, isoprene, chloroprene, bromoprene, fluoroprene, 2,3-dimethylbutadiene, 2-ethylbutadiene, and 2,3-diethylbutadiene; alkoxybutadienes such as 2-methoxybutadiene, and 2-ethoxybutadiene; phenylbutadienes such as 2-phenylbutadiene and 2,3-diphenylbutadiene. Obviously, any other substituted butadienes which will undergo condensation with maleic anhydride are within the scope of our invention.

Our invention is illustrated by the following example. The reactants, their proportions, and other specific ingredients are presented as being typical and should not be construed to limit the invention unduly.

*Example I*

A reactor was charged with a benzene solution of butadiene, and maleic anhydride was added, the amounts being in the ratio of 1 mole butadiene, 3 moles benzene, and 1.1 moles maleic anhydride. The reactor was closed and the reaction allowed to proceed ten hours at room temperatures prior to being heated for 24 hours at 50° C. to complete the reaction. Upon cooling the reactor contents, crystals of tetrahydrophthalic anhydride separated and were removed by filtration. The filtrate was diluted with an equal quantity of petroleum ether and more crystals were obtained. The yield of tetrahydrophthalic anhydride was substantially quantitative.

Tetrahydrophthalic anhydride thus obtained was converted into hexahydrophthalic anhydride by reduction over a Raney nickel catalyst. In order to accomplish this reduction, a mixture comprising materials in the ratio of 1 mole of the anhydride, 7.5 moles ethyl acetate, and 25 ml. Raney nickel catalyst sludge was contacted with 1 mole hydrogen at room temperature. The initial hydrogen pressure was about 45 pounds per square inch. Absorption of the hydrogen occurred as the mixture was agitated. When absorption was complete the solution was filtered free of catalyst and evaporated until a thick paste of hexahydrophthalic anhydride remained. The yield of hexahydrophthalic anhydride was substantially quantitative.

The preparation of diethyl hexahydrophthalate from the hexahydrophthalic anhydride thus formed was effected by treatment of the anhydride with anhydrous HCl and alcohol. Materials were used in the following proportions: 0.8 mole anhydrous HCl, 21 moles commercial absolute alcohol, and 1.38 moles hexahydrophthalic anhydride. The anhydride was added to the HCl-alcohol solution and the mixture refluxed for four hours. The alcohol was removed by distillation, 5 parts of water was added, and neutralization was accomplished by the addition of sodium bicarbonate. The ester was extracted with ether and the extract dried over anhydrous sodium sulfate after which the ether was removed by distillation at atmospheric pressure. The diethyl ester, boiled at 134–136° C./11 mm., and was obtained in a 72.1 per cent yield.

Conversion of the diethyl hexahydrophthalate thus formed to 1,2-bis-(hydroxymethyl) cyclohexane was effected under completely anhydrous conditions by treatment of an ethyl alcohol solution of the ester with sodium. One mole of the ester was added to 69 moles absolute alcohol and 12 gram atoms sodium introduced as rapidly as possible. The reactor was cooled as needed to prevent the reaction from becoming too violent. After the reaction subsided, heat was applied to reflux the mixture until the last traces of sodium had disappeared. Subsequent to cooling, the reaction mixture was hydrolyzed by the addition of water, and the alcohol then removed by distillation. The residue, which consisted of two layers, was diluted with an additional quantity of water to prevent crystallization of salts, saturated with sodium chloride to prevent formation of an emulsion, and extracted with ether. The ether extract was dried over anhydrous calcium sulfate and then removed by distillation. The 1,2-bis-(hydroxymethyl) cyclohexane product boiled at 145–146° C./5 mm., had a refractive index $n_D^{25}$ of 1.4880, and a density at 25° C. of 1.041. A 60 per cent yield was obtained.

1,2-bis-(iodomethyl) cyclohexane was prepared from the 1,2-bis-(hydroxymethyl) cyclohexane formed in the preceding step by treatment, in benzene solution, with iodine and red phosphorus. Benzene (5.2 moles) was charged to a stirred reactor and 0.76 gram atom of red phosphorus and 2.32 gram atoms of iodine were added. A solution of 1 mole 1,2-bis-(hydroxymethyl) cyclohexane in 2.6 moles benzene was introduced slowly and the mixture then refluxed 24 hours. The mixture was cooled, filtered, washed with water, and then with a 5 per cent aqueous solution of sodium hydroxide saturated with salt, and finally again with water. The combined washings were extracted with benzene and the washing procedure repeated as described above. The benzene extracts were dried over anhydrous calcium chloride, the benzene removed by distillation at 175 mm., and the diiodide distilled at 139–141° C./3 mm. A yield of 70.5 per cent was obtained. Further purification of the material was effected by washing with dilute sodium hydroxide solution, extracting with ether, drying over anhydrous calcium sulfate, removing the ether by distillation and finally distilling the 1,2-bis-(iodomethyl) cyclohexane. The purified product was a colorless liquid having a density at 20° C. of 2.001. Analysis of the compound gave the following results:

| Analysis | Calculated for $C_8H_{14}I_2$ | Found |
|---|---|---|
| Per cent I | 69.8 | 71.4 |

The impure material had a red color.

1,2-dimethylenecyclohexane was procured from the 1,2-bis-(iodomethyl) cyclohexane in the following manner: A solution of 3 moles of 80 per cent pure potassium hydroxide in 12.4 moles methanol was charged to a stirred reactor and 1 mole of the 1,2-bis-(iodomethyl) cyclohexane was added slowly, after which the mixture was refluxed two hours. Sufficient water was added to dissolve the mass of salts formed during the reaction. The upper layer of crude diene was separated, washed with water, dried over calcium chloride containing a small quantity of hydroquinone, and distilled. The product, 1,2-dimethylenecyclohexane, boiled at 48.8–49.4 C./55 mm., had a refractive index $N_D^{25}$ of 1.4710, and a density at 25° C. of 0.8229. A 70 per cent yield was obtained. Analysis of a sample of the material gave the following results:

| Analysis | Calculated for $C_8H_{12}$ | Found |
|---|---|---|
| Per cent C | 88.8 | 88.9 |
| Per cent H | 11.2 | 11.2 |

The 1,2-dimethylenecyclohexane product was further characterized by its reaction with maleic anhydride, and its structure was established through its oxidation to adipic acid.

*Example II*

1,2-bis-(hydroxymethyl)-cyclohexane (1 mole) is mixed at room temperature with acetyl chloride (2.25 moles) and the resulting mixture heated under reflux on a water bath for a period ranging from 5 to 30 minutes. The material is then distilled under reduced pressure. Acetic acid, hydrogen chloride and unreacted acetyl chloride are removed as overhead distillation products and crude diacetate remains as kettle product, which is then distilled under vacuum to attain diacetate of desired purity. The diacetate product is then pyrolyzed by passing it through a tube heated to a temperature within the range of 300–500° C., and which is packed with an inert material such as asbestos, pumice, quartz, or silica tablets. The gas effluent from the packed tube contains 1,2-dimethylenecyclohexane together with by-products of the reaction. The gas is passed through a suitable condensing system, and the condensate is distilled under reduced pressure to provide the 1,2-dimethylenecyclohexane product.

As will be evident to those skilled in the art, various modifications of this invention can be made, or followed, in the light of the foregoing disclosure and discussion, without departing from the spirit or scope of the disclosure or from the scope of the claims.

We claim:

1. A method for the production of 1,2-dimethylenecyclohexane, which comprises the steps of condensing 1,3-butadiene with maleic anhydride to produce tetrahydrophthalic anhydride, hydrogenating said tetrahydrophthalic anhydride to produce hexahydrophthalic anhydride, esterifying said hexahydrophthalic anhydride to produce diethyl hexahydrophthalate, reacting said diethyl hexahydrophthalate with sodium in the presence of ethanol to form 1,2-bis-(hydroxymethyl)-cyclohexane, reacting said 1,2-bis-(hydroxymethyl)-cyclohexane with iodine in the presence of phosphorus to produce 1,2-bis-(iodomethyl)-cyclohexane, and dehydrohalogenating said 1,2-bis-(iodomethyl)-cyclohexane to produce 1,2-dimethylenecyclohexane.

2. A method for the production of 1,2-dimethylenecyclohexane which comprises the steps of esterifying hexahydrophthalic anhydride to form diethylhexahydrophthalate, reacting said diethylhexahydrophthalate in the presence of sodium and ethanol to form 1,2-bis(hydroxymethyl)-cyclohexane, reacting said 1,2-bis(hydroxymethyl)-cyclohexane with iodine in the presence of phosphorus to produce 1,2-bis-(iodomethyl)-cyclohexane, and dehydrohalogenating said 1,2-bis-(iodomethyl)-cyclohexane to produce 1,2-dimethylenecyclohexane.

3. The process of claim 2 in which at least part of the 1,2-bis-(iodomethyl)-cyclohexane is recovered as a product of the process.

JOHN E. WICKLATZ.
JAMES N. SHORT.

REFERENCES CITED

The following references are of record in the file of this patent:

UNITED STATES PATENTS

| Number | Name | Date |
|---|---|---|
| 2,351,311 | Alder et al. | June 13, 1944 |
| 2,431,755 | Ipatieff et al. | Dec. 2, 1947 |
| 2,435,443 | Ipatieff et al. | Feb. 3, 1948 |

OTHER REFERENCES

Haworth, J. Chem. Soc., 103, 1244 (1913).

Faraday, Encyclopedia of Hydrocarbon Compounds, vol. $C_8$ ($C_8H_{12}$), p. 08042.70.11.